United States Patent [19]

Bruno et al.

[11] 4,075,059
[45] Feb. 21, 1978

[54] REACTOR POWER REDUCTION SYSTEM AND METHOD

[75] Inventors: Stephen James Bruno, Medway, Mass.; Stephen Alfred Dunn, Enfield; Marvin Raber, West Hartford, both of Conn.

[73] Assignee: Combustion Engineering, Inc., Windsor, Conn.

[21] Appl. No.: 681,101

[22] Filed: Apr. 28, 1976

[51] Int. Cl.² .......................... G21C 7/06; G21C 7/00
[52] U.S. Cl. .................................. 176/22; 176/19 R; 176/24
[58] Field of Search .................. 176/20 R, 20 SS, 22, 176/24, 25, 19 R, 19 EC

[56]  References Cited
U.S. PATENT DOCUMENTS

| | | | |
|---|---|---|---|
| 3,267,002 | 8/1966 | Fromm | 176/25 |
| 3,423,285 | 1/1969 | Curry | 176/24 |
| 3,565,760 | 2/1971 | Parkos | 176/24 |
| 3,578,562 | 5/1971 | Johnson | 176/22 |
| 3,778,347 | 12/1973 | Giras | 176/24 |
| 3,933,580 | 1/1976 | Aleite | 176/24 |

OTHER PUBLICATIONS

Schultz, "Control of Nuclear Reactors and Power Plants", 2nd ed. McGraw-Hill.
Liptak, "Instrumentation in the Processing Industries", Chilton Book Co.

Primary Examiner—Stephen C. Bentley
Assistant Examiner—Donald P. Walsh

[57]  ABSTRACT

A method of operating a nuclear power reactor is disclosed which enables an accelerated power reduction of the reactor without completely shutting the reactor down. The method includes monitoring the incidents which, upon their occurrence, would require an accelerated power reduction in order to maintain the reactor in a safe operation mode; calculating the power reduction required on the occurrence of such an incident; determining a control rod insertion sequence for the normal operation of the reactor, said sequence being chosen to optimize reactor power capability; selecting the number of control rods necessary to respond to the accelerated power reduction demand, said selection being made according to a priority determined by said control rod insertion sequence; and inserting said selected control rods into the reactor core.

11 Claims, 13 Drawing Figures

FROM FIG. 8a

DOPPLER REACTIVITY DEFECT:

$$\rho_D(INITIAL)$$
$$\rho_D\begin{pmatrix}FINAL\\MAX\end{pmatrix}$$
$$\rho_D\begin{pmatrix}FINAL\\MIN\end{pmatrix}$$
$$\Delta\rho_D(MIN) = \rho_D(INT) - \rho_D\begin{pmatrix}FINAL\\MAX\end{pmatrix}$$
$$\Delta\rho_D(MAX) = \rho_D(INT) - \rho_D\begin{pmatrix}FINAL\\MIN\end{pmatrix}$$

— 116

MODERATOR REACTIVITY DEFECT:

$$\rho_M(INITIAL)$$
$$\rho_M\begin{pmatrix}FINAL\\MAX\end{pmatrix}$$
$$\rho_M\begin{pmatrix}FINAL\\MIN\end{pmatrix}$$
$$\Delta\rho_M(MIN) = \rho_M(INT) - \rho_M\begin{pmatrix}FINAL\\MAX\end{pmatrix}$$
$$\Delta\rho_M(MAX) = \rho_M(INT) - \rho_M\begin{pmatrix}FINAL\\MIN\end{pmatrix}$$

— 118

PERMISSABLE REACTIVITY MAX & MIN

$$\Delta\rho\ MAX = \Delta\rho_M(MAX) + \Delta\rho_D(MAX)$$
$$\Delta\rho\ MIN = \Delta\rho_M(MIN) + \Delta\rho_D(MIN)$$

— 120

INDEX = 1 — 122

CALL SUBROUTINE WORTH — 124

$ADRHO(I) = DRHOTOT(I) * (1.0 - WF(I))$ — 126

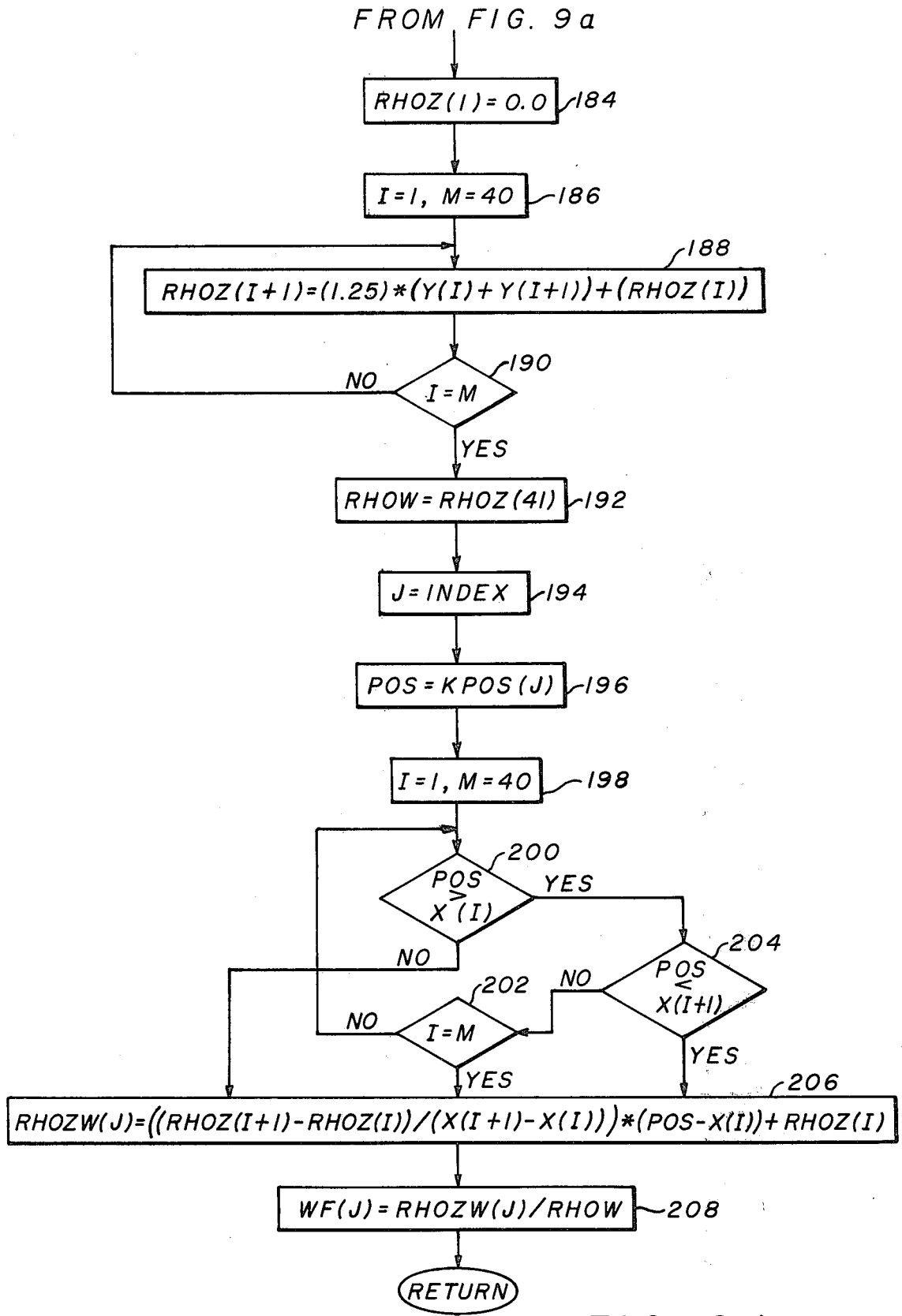

REACTOR POWER REDUCTION SYSTEM AND METHOD

BACKGROUND OF THE INVENTION

This invention relates to a control system for a nuclear reactor. More specifically, this invention relates to a method and a system which enables an accelerated power reduction in response to incidents which require a sudden step reduction in reactor power without total reactor shutdown.

The modern nuclear power reactor is an intricate combination of many complex interrelated components and systems. During normal operation of the power reactor, it is not uncommon for undesirable events, such as failure of one of the components or systems, to occur, which, if neglected, would seriously jeopardize the safety and/or operability of the nuclear power plant. As a result, control systems for controlling the reactor system must be developed to respond to these events. The power producing cores of nuclear reactors are normally controlled in one of two ways: (1) the slow advance of individual control rods or groups of control rods into or out of the core to provide power manuvering control of the reactor, or (2) rapid insertion of control rods into the core to accomplish an emergency shutdown of the reactor. This second mode of control is called reactor "scram" or control rod "scram." Even though many of the possible undesirable events which can occur during normal operation require at most only a rapid reduction in power level, the conventional response to such undesirable events has been to shut down the reactor as rapidly as possible by scramming the control rods into the core. The main reason behind this excessive and sometimes unnecessary response is that the control rods cannot ordinarily be driven fast enough, into the core, even at their maximum speed of insertion, to satisfy the accelerated power reduction demand. A full scram on the other hand cannot be employed without completely shutting down the reactor. Full reactor scram is not ordinarily desirable since reactor scram is disruptive of the smooth operation of an electrical supply system and can give rise to a number of undesirable events. In the first place, the sudden change in reactivity imposed by rapidly operated control elements applies a thermal shock throughout the reactor system. This thermal shock is felt mostly in the fuel elements of the reactor which is the location where it is least desired. In the second place, an undesirable disturbance is applied to the electrical grid network to which the nuclear power plant is connected. In the third place, a complete shutdown may subsequently cause a delayed start-up of the power reactor due to xenon poisoning of the reactor core.

It is not uncommon that the necessity for an immediate reduction of power falls short of a requirement for the complete shutdown of the reactor. In such cases, partial reduction of the power level is permissible as long as the power reduction causes the reactor to assume a safe condition. Thus, if an accelerated partial power reduction can be accomplished, complete shutdown of the reactor can often be avoided. In this event the reactor operators may be able to diagnose and correct the original trouble thereby enabling the immediate return to full reactor power with a minimum of the undesirable events described above. Thus, in order to increase reactor availability, there is a need to provide a system which has the ability to respond to certain incidents, such as loss of one out of two steam generator feedwater pumps, by rapidly reducing power without complete shutdown of the reactor.

DESCRIPTION OF THE PRIOR ART

Reactor dynamics and reactor physics indicate that there are two considerations that should be kept in mind when an accelerated power reduction is initiated: the first is final reactor power level and the second is the core power distribution. Reactor power level can be thought of in terms of average power of the core or in terms of the total power being generated at one time by the reactor. Core power distribution, described in terms of "peaking factor," is a conventional and well-known term in the art of reactor physics and is a measure of the degree of deviation of a localized power from core average power. Hence, the "peaking factor" is defined as the ratio of the localized peak power to the average power of the core.

Each of the many incidents which produces the need for an accelerated power reduction has a characteristic power level to which the power must be reduced in order for the reactor to stay critical without violating reactor safety or system design limits. Examples of typical incidents which require accelerated power reductions are: partial or full load rejection, loss of a reactor coolant pump, deviation of a control element assembly (CEA) from its desired position (including a dropped CEA), and loss of a steam generator feedwater pump. This discussion will focus primarily on the incident involving the loss of a steam generator feedwater pump, although it should be recognized that an accelerated power reduction may be designed for each of the other incidents as well.

On the occurrence of a loss of a steam generator feedwater pump, the flow of the secondary coolant or working fluid to the steam generator is reduced, since the remaining pump is unable to provide 100 percent of the feedwater demanded by the steam generator. When this happens, the steam generator consumes water (by converting it into steam) faster than the water in the steam generator can be replaced, which results in a consequent drop of the water level in the steam generator. This situation cannot be tolerated for very long before the reactor and turbine are caused to trip on a signal indicating low steam generator water level. If the reactor power is immediately and rapidly reduced to a sufficient degree, however, the steam generator's ability to produce steam is reduced, thereby permitting avoidance of the reactor-turbine trip on a low steam generator water level. In the typical nuclear power plant, where two feedwater pumps with 65 percent of full feedwater flow capacity to each steam generator are provided, the reduced power demanded by the loss of one feedwater pump in order to avoid a reactor trip is 75 percent of full reactor power. This restricted power, which allows continued reactor operation after the loss of a feedwater pump, is determined by the capacity of the pumps of the system and the characteristics of the steam generator. In a similar manner the restricted powers corresponding to the other incidents which require an accelerated power reduction are determined from considerations of the dynamics and characteristics of the various parts of the nuclear steam supply system.

So far as is known, the prior art methods which attempt to maintain the reactor in a critical state while responding to incidents which require rapid power reductions by inserting control rods have focused primarily on rapid reduction of power to closely match the restricted power while substantially ignoring considerations of core power distribution. By so operating, it is believed that the prior art techniques either seriously limit the power capability of the reactor or seriously endanger the reactor operating design limits. The second alternative is clearly unacceptable since, if the peaking factors or the power distribution are allowed to exceed the limits placed on them, it is possible to overheat the fuel rods in the core with consequent damage to fuel. Such damage results in the contamination of the coolant and the coolant system with radioactive fission products. On the occurrence of such a contamination, the reactor must be shut down and the damaged fuel rods replaced. If such undesirable consequences were to result, the direct result of the prior art accelerated power reduction would be a greater loss in reactor availability and income to the utility than if the reactor were simply allowed to trip. In other words, more harm than good would result by this prior art method of operating a nuclear reactor.

It is possible to operate a nuclear reactor in a manner that allows accelerated power reductions with maximum response to power matching and with minimum attention being paid to power distribution, but as has been mentioned above, a substantial sacrifice in reactor power capability ensues. This possible method of operation is as follows. The reactor is operated with sufficient margin to the reactor design limits so that the distorted power distribution which results from the insertion of the selected rods does not cause the design limits to be violated. However, in order to do this, the reactor must be restricted to an operating power level which is substantially less than the maximum power level attainable by the reactor and a substantial continuous operating penalty is incurred. This operating penalty represents a serious reduction in capability since the restriction on power must be imposed at all times during the normal operation of the reactor in view of the fact that an accelerated power reduction may be required at any time during normal operation of the reactor.

One prior art system seems to accept the penalties imposed by the inclusion of a system for initiating an accelerated power reduction without paying heed to the power distribution. That prior art system responds to a loss of load incident or a loss of primary coolant pump incident by first dropping one pair of rods which are symmetrically situated across the core from one another. It is believed that right from the outset this rod severely distorts the power distribution of the core. Subsequent to the rod drop, the core power is monitored and if, after approximately three seconds, it is determined that the first rod drop was insufficient to reduce the power to below the appropriate restricted power level, a second pair of rods is dropped. After another three seconds, the situation is again examined and in this manner, as many as four pairs of rods may be successively dropped into the core. This method has the advantage that the reactivity of the pairs of rods to be dropped may be small so that by using the small increments of reactivity insertion, it can be expected that the final power will closely match the restricted power demanded by the particular incident necessitating the accelerated power reduction. However, the method has a serious disadvantage in that by dropping two rods at a time the power distribution is seriously distorted and fuel design limits may be exceeded unless the original power had been initially restricted as described above.

An additional disadvantage is that by dropping pairs of rods, the core is burned up in a nonuniform manner which may result in burn-up history logging and computation uncertainties and in restrictions on power maneuvering or reactor operation toward the end of the life of the reactor core.

SUMMARY OF THE INVENTION

It has been discovered that power distribution cannot be so callously ignored as seems to have been done in the prior art systems. Accordingly, it is a novel feature of this invention that an accelerated power reduction can be accomplished by dropping regulating groups of control rods, (i.e., those control rods designated for normal regulating of the reactor) in their predesignated regulating sequence. These regulating groups and the insertion sequence have been prechosen and designed to minimize the effect of their insertion on radial power peaking. The method contemplates as a first step the calculation of the power reduction which is required by the occurrence of an incident, such as the loss of one out of two steam generator feed water pumps. After the magnitude of the required power reduction is determined, the control rods necessary to reduce the reactor power to below the maximum allowable power required by the power reduction demand are selected, according to the priority of the chosen control rod insertion sequence. The preferred method for the practice of the invention is an open loop calculation in which the effect on power of various control rod insertions is precalculated in order to predetermine all of the rods required to reduce the power to below the maximum acceptable power level, with subsequent insertion of the appropriate number of control rods at substantially the same time.

DESCRIPTION OF THE DRAWINGS

The present invention may be better understood and its objects and advantages will become apparent to those skilled in the art by reference to the accompanying drawings wherein like reference numerals refer to like elements in the several figures and in which:

FIGS. 8a–8c is a flow chart illustrating one example of software which selects the rods that are to be inserted into the reactor.

FIGS. 9a-9b is a flow chart which illustrates the subroutine "WORTH" which is utilized to calculate the worths of the available control rod insertions.

DESCRIPTION OF THE PREFERRED EMBODIMENT

Figure 1:
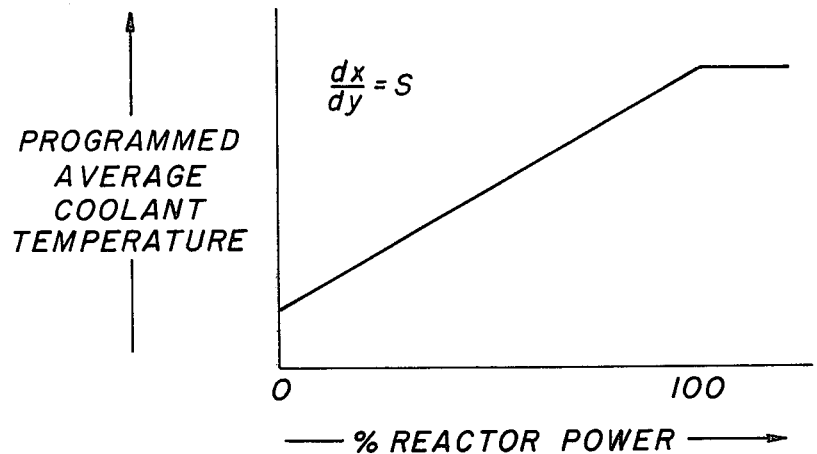
FIG. 1 is a plot depicting reactor power plotted against programmed average coolant temperature, the slope of which curve is symbolized as S.

When a rapid reduction of reactor power is desired, and is to be made by dropping control rods into the reactor core as disclosed in this invention, the extent of the required power reduction will be determined by the event which necessitates the power reduction. For example, if one of two main steam generator feed water pumps is stopped, the the maximum power level at which the reactor can operate will be determined by the flow capacity of the remaining pump. The difference between the power level at which the reactor is initially operating and the maximum permissible power level after the event is the minimum required power reduction for this case. The maximum power level after the event or the minimum required power reduction is one of three constraints on the selection of control rods to be dropped. That is, the effect of the selected control rods on reactor power must be such as to result in a power reduction at least as great as the minimum required power reduction. The maximum permissible power level after the event is that power level above which the reactor protection or equipment protection systems would cause an automatic trip if operation of the system were to be continued.

When a rapid power reduction is made, it is desirable to minimize the effect of the power reduction so that the reactor subsequently operates at the highest possible power level without actually exceeding the maximum permissible power level established by the event. However, the nature of the reactor is such that it is not possible to always achieve an optimum power reduction since the effect of any given set of control rods on reactor power reduction will vary as the reactor core is depleted. Thus, a set of control rods which may create an acceptable power reduction near the end of the useful life of a reactor core may effectively "shut down" the reactor at the beginning of core life. Therefore, it is also necessary to constrain the maximum permissible power reduction that will result when the control rods are dropped into the reactor core so that the accelerated power reduction does not completely shut down the reactor.

In addition to the two constraints described above, there is another factor that must be considered as already discussed. This factor is the effect of the insertion of the control rods on the spatial power distribution of the reactor core. In general, pressurized water reactors are designed such that power generation is most uniform when no control rods are inserted into the reactor core. As a result, the spatial power distribution of the reactor core becomes more non-uniform as control rods are inserted. In order to avoid damage to the reactor core, it is desirable to maintain the core power distribution as uniform as possible. Thus, the control rods used for a rapid reactor power reduction should be selected so as to result in a minimum distortion of the reactor power distribution.

In order to describe the degree to which a reactor power distribution is non-uniform, the concept of the radial peaking factor is used. The radial peaking factor is defined as the ratio of the total power generated in the hottest pin or fuel element to that generated in the average pin or fuel element. The heat generated in the hottest fuel element is proportional to the product of reactor power times the radial peaking factor. In order to avoid fuel damage when the selected control rods are dropped into the reactor core, it is desirable that the heat generated in the hottest fuel element does not increase. Therefore, it is one novel aspect of this invention that the control rods to be dropped to accomplish an accelerated power reduction are selected on the basis that the product of the radial peaking factor and reactor power does not increase as a result of dropping the selected control rods.

It has been conventional in the design of nuclear reactors that a set of control rods or a sequence of control rods, called regulating rods, be provided for the normal control of the reactor. In order to accomplish reactor control these regulating rods are advanced into or out of the reactor core at a relatively slow rate. It is the characteristic of desirable reactor control that insertion of the regulating rods into the reactor core also result in a minimum distortion of the reactor power distribution. Accordingly, this invention utilizes the fact that the constraint on radial peaking factor is automatically met by using the sequence of regulating rods normally used to regulate reactor power. Therefore, as long as the control rods are dropped into the core in the same sequence as that in which they would normally be driven into the reactor core, the constraint on power distribution will be met and only the two constraints on the extent of the power reduction as described above must be considered. The following discussion consists of a means of automatically determining which subset of the normal sequence of control rod groups will satisfy these two constraints.

The effectiveness of control rods in producing a change in reactor power is normally described in terms of control rod reactivity. When the control rods are dropped into the reactor core, the reactor will stabilize at a power level and temperature such that the total reactivity is zero. Therefore, the control rod reactivity effect must be balanced by some equal and opposite effects. In the short term (i.e., periods of time less than or equal to a few hours), these opposite effects are caused by reduction in the average temperature of the reactor fuel and in the average temperature of the reactor coolant. The change in core reactivity due to a change in the fuel temperature is termed the Doppler reactivity change, while the change in reactivity due to a change in the average coolant temperature is termed the moderator reactivity change. The short-term reactivity balance described above may be expressed in terms of the following equation:

$$1.\ \delta\rho_R + \delta\rho_D + \delta\rho_W = 0$$

where $\delta\rho_R$ = control rod reactivity change
$\delta\rho_D$ = Doppler reactivity change
$\delta\rho_W$ = moderator reactivity change The control rod reactivity worth is known prior to reactor startup by means of detailed computer calculations and is, of course, verified by means of testing during initial reactor operation. Therefore, the effect of the control rod drop on the reactor power reduction can be predicted by relating the two terms $\delta\rho_D$ and $\delta\rho_W$ to changes in reactor power.

The moderator temperature is normally controlled to a value which is programmed as a function of power (see FIG. 1). The concept is the subject of the U.S. Pat. No. 3,423,285 issued to C. F. Curry. If the reactor is operated in a manner similar to that described in the Curry patent, then changes in reactor power are directly related to changes in moderator temperature, and it is only necessary to relate changes in this temperature to changes in reactivity. This is normally done through the concept of the moderator temperature coefficient of reactivity, expresses as follows:

$$2. \quad \delta\rho_W = \gamma_W \hat{T}_W$$

where $\gamma_W =$ moderator temperature coefficient of reactivity
$\hat{T}_W =$ change in moderator temperature.

Figure 2:
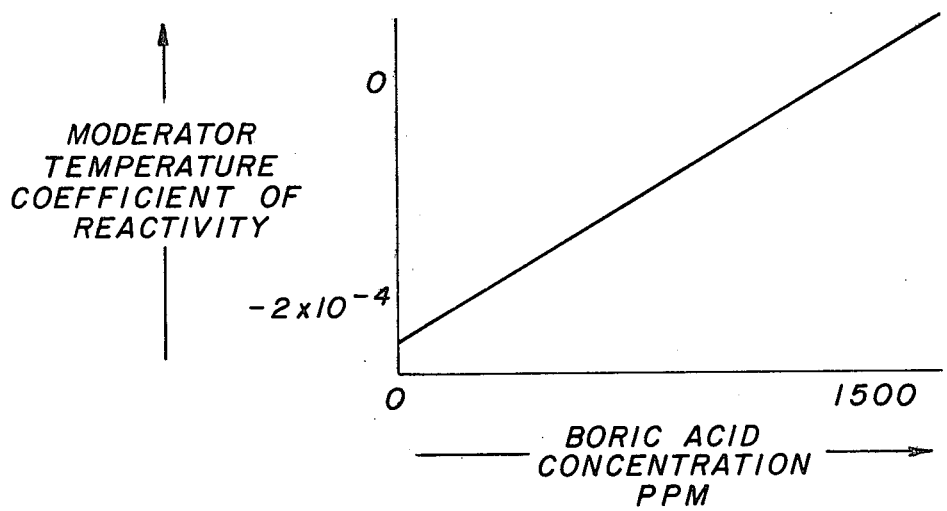
FIG. 2 is a plot depicting boric acid concentration plotted against moderator temperature coefficient of reactivity.

The moderator temperature coefficient of reactivity varies significantly as the burnup of the reactor core progresses, but is essentially a linear function of the concentration of boric acid dissolved in the reactor coolant, as is shown in FIG. 2.

Figure 3:
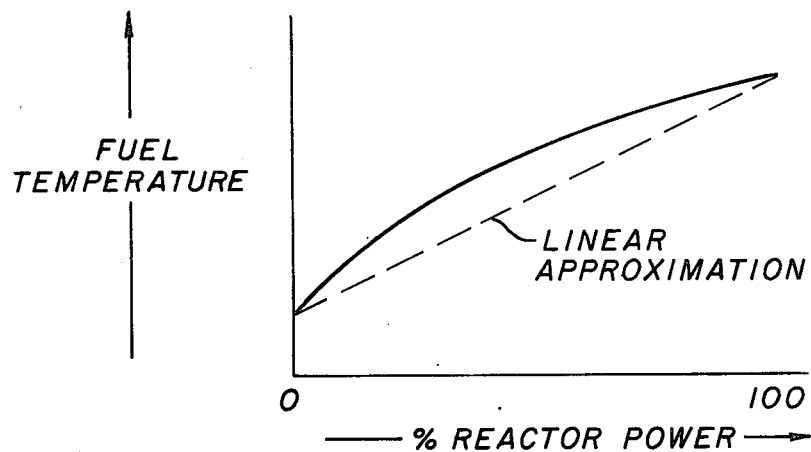
FIG. 3 is a plot depicting reactor power plotted against fuel temperature with a linear approximation thereof.
Figure 4:
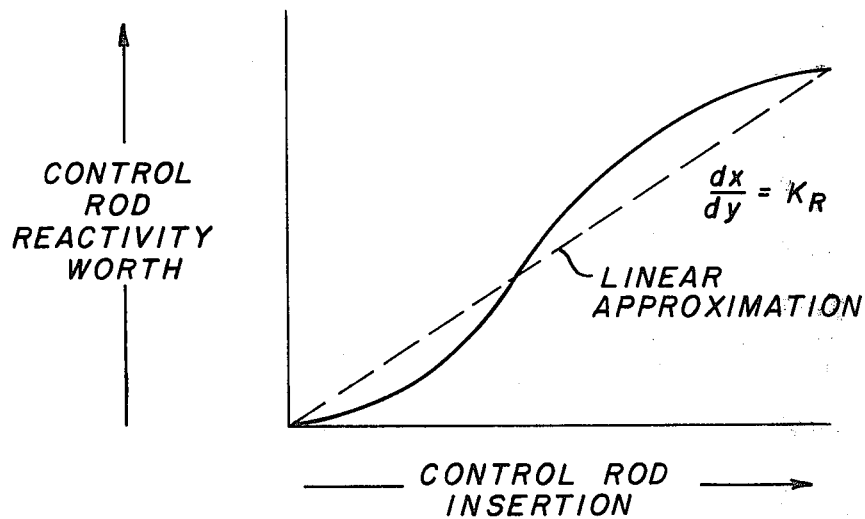
FIG. 4 is a plot depicting control rod insertion plotted against control rod reactivity worth for a typical reactor, and a linear approximation thereof.

In a similar manner, variations in total core reactivity with changes in fuel temperature can be expressed by means of the concept of the Doppler coefficient of reactivity, as follows:

$$3. \quad \delta\rho_D = Y_D \hat{T}_f$$

where $\gamma_D =$ Doppler coefficient of reactivity
$\hat{T}_f =$ change in effective fuel temperature The effective fuel temperature itself is a function of the reactor power level, as is shown in FIG. 3. While this function is nonlinear, a linear approximation to this curve is in most cases adequate to select which control rods to drop for a rapid power reduction.

Using these concepts, an expression for the power change due to a control rod drop can be derived as follows:

$$4. \quad B_f = B_i - K\delta\rho_R$$

where $B_f =$ final reactor power after the control rod drop
$B_i =$ initial reactor power
$K =$ change in power/change in core reactivity $$K = \frac{\delta B}{\delta\rho_D} + \frac{\delta B}{\delta\rho_W} \qquad 5.$$

$$= \left[\frac{\delta T_f}{\delta B} \frac{\delta\rho_D}{\delta T_f}\right]^{-1} + \frac{\delta B}{\delta T_W} \frac{\delta T_W}{\delta\rho_W}$$

$$= \left[\frac{\delta T_f}{\delta B} \gamma_D\right]^{-1} + S^1 \gamma_W^{-1}$$

where $\delta T_f/\delta B =$ change in fuel temperature per unit change in reactor power (see FIG. 3) and
$S =$ the slope of the function of programmed average coolant temperature versus reactor power (FIG. 1).

Since the moderator temperature coefficient is essentially a linear function of the dissolved boron concentration it may be expressed as follows:

$$6. \quad Y_W = \mu + \eta C_B$$

where $C_B =$ dissolved boric acid concentration $\mu$ and $\eta$ are constants. Therefore, $$K = \left(\frac{\delta T_f}{\delta B} Y_D\right)^{-1} + S^{-1}(\mu + \eta C_B)^{-1} \qquad 7.$$

$$= \beta + S^{-1}\gamma_W^{-1}$$

where $\beta =$ constant.

With the above expression, equation (4) can be rewritten as:

$$8. \quad B_f = B_i - [\beta + S^{-1}\gamma_W^{-1}] \delta\rho_R + B_i - [\beta + S^{-1} (\mu + \eta C_B)^{-1}] \delta\rho_R.$$

If the control rod reactivity worth, $\delta\rho_R$, is known, then equation (8) can be solved for the final reactor power level after a control rod drop by taking only two measurements: reactor power ($B_i$) and dissolved boron concentration ($C_B$), both of which are variables which are normally monitored on pressurized water reactors.

Figure 5:
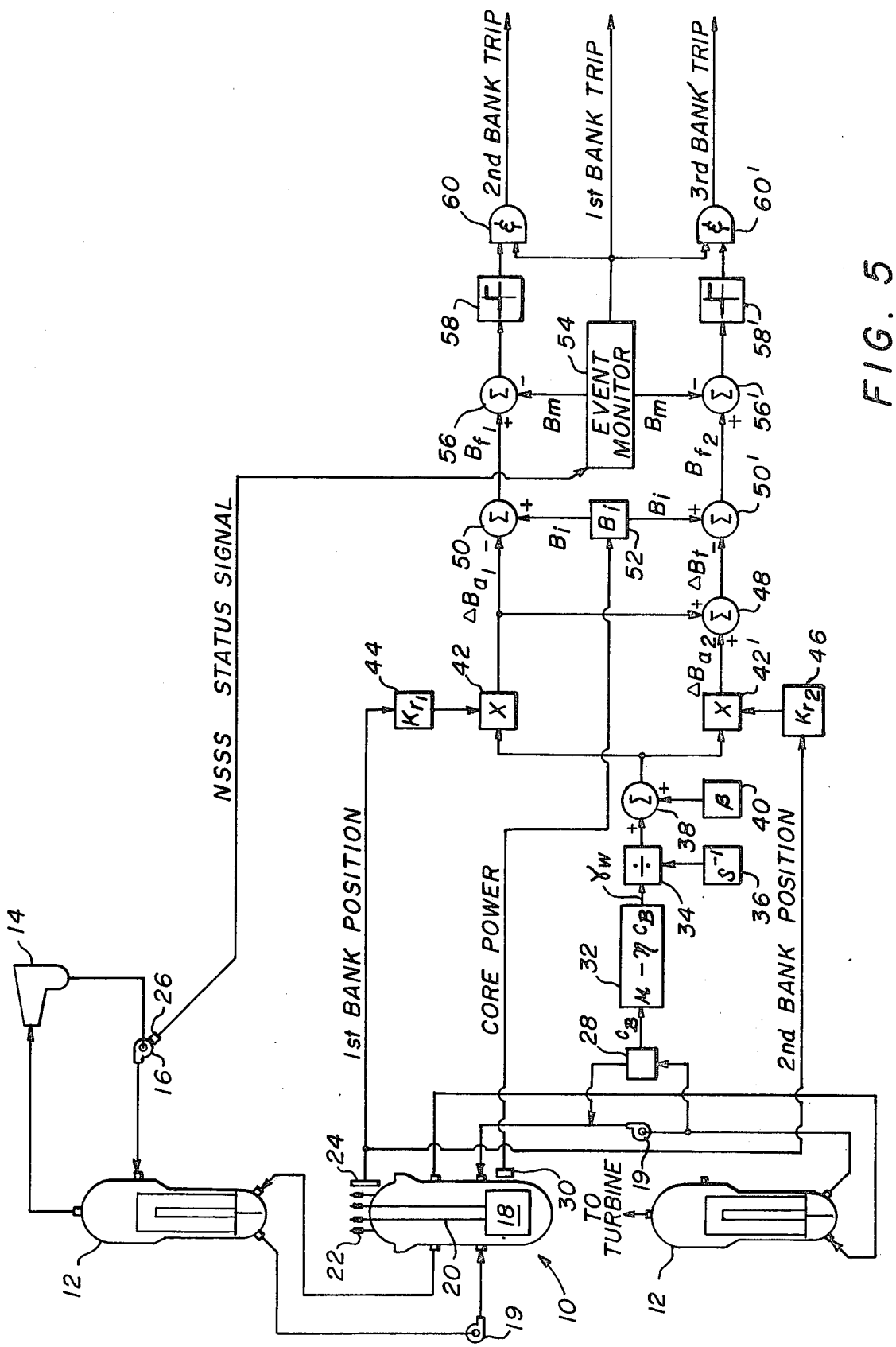
FIG. 5 is a diagrammatic representation of a means for initiating an accelerated power reduction by comparing final power to a maximum permissible final power.
Figure 6:
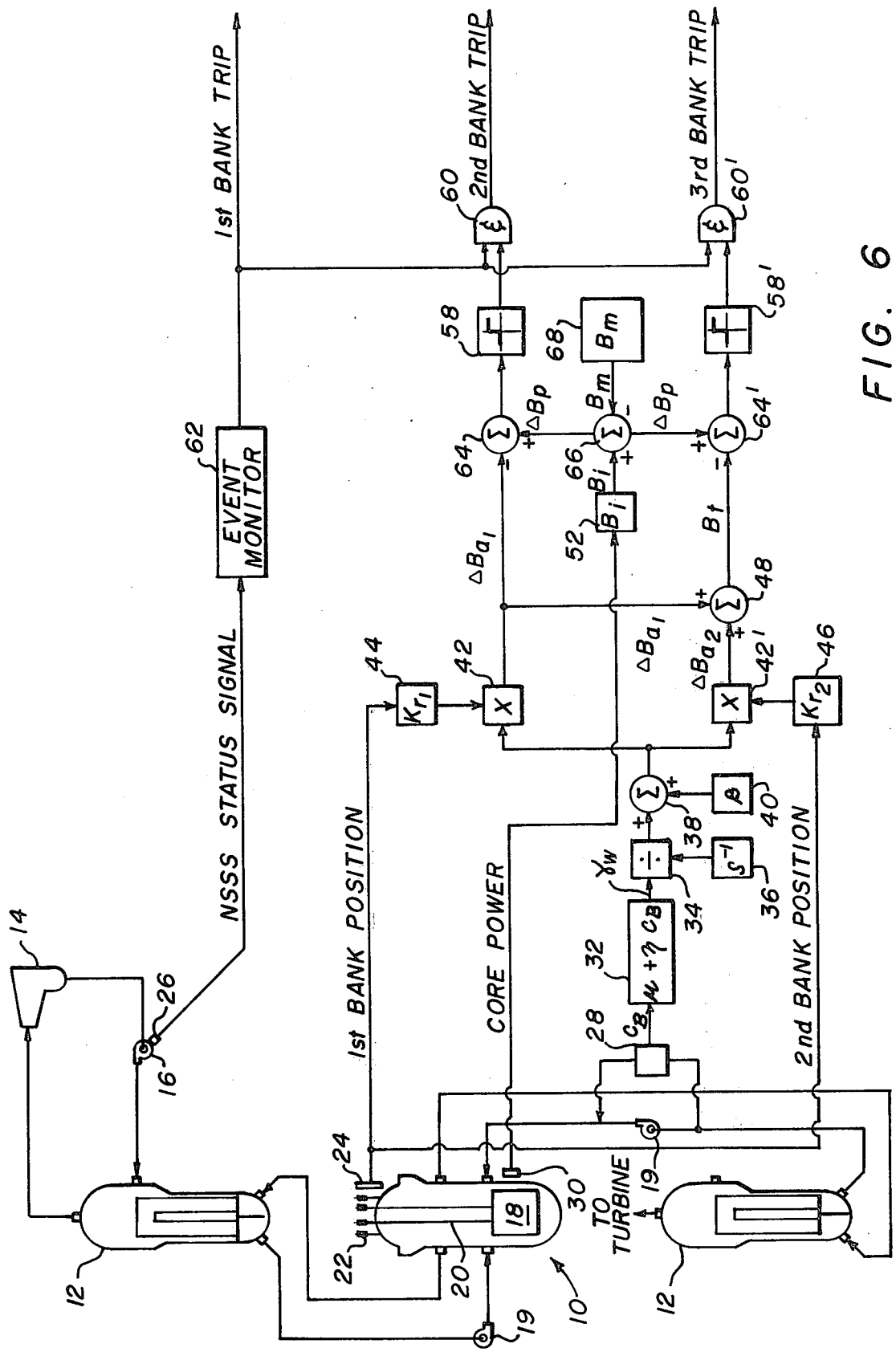
FIG. 6 is a diagrammatic representation of a means for initiating an accelerated power reduction by comparing the desired change in power to the actual change in power caused by selected rod insertion.

Since according to this invention the regulating rods are always dropped into the core in their normal insertion sequence, the first group of rods in the sequence is always dropped when a rapid power reduction is called for. Therefore, the control rod selection logic need only ascertain whether additional control rod groups in the sequence need be dropped. FIGS. 5 and 6 illustrate two basic schemes for the rod group selection that is necessary to decide whether to drop second and third control rod groups.

FIG. 5 is a diagrammatic illustration of an accelerated power reduction actuation system for a nuclear reactor 10. The reactor 10 consists of a nuclear core 18 which is controlled by control rods 20 which in turn are actuated by control rod control mechanisms 22. In the operation of a pressurized water reactor, the coolant is circulated through the core 18 thereby cooling the core and heating the coolant. This heated primary coolant is then passed through a steam generator 12 where it exchanges its heat with a secondary coolant which circulates through the secondary side of the steam generator 12. After exchanging its heat with the secondary coolant, the primary coolant is then recirculated by reactor coolant pumps 19 back to the reactor 10 and back to the reactor core 18.

The secondary coolant, ordinarily water, is heated from its liquid phase to its vapor phase and then is passed to the turbine 14. The turbine 14 converts the heat energy of the vaporous phase into mechanical energy. The secondary coolant is then condensed and is recirculated to the steam generator 12 by steam generator feedwater pumps 16. The combination of the nuclear reactor 10, and the steam generator 12 is ordinarily called the nuclear steam supply system.

The accelerated power reduction actuation system as illustrated in FIG. 5 interfaces with the nuclear steam supply system by monitoring the primary coolant boron concentration by a boron concentration analyzer 28 or boronometer. The system also detects the average core power of the nuclear reactor core 18 by a neutron flux detector 30, and monitors the position of the control rods 20 by control rod position detector 24. Finally, the system minitors the status of the nuclear steam supply system (NSSS) so that the occurrence of an event which requires an accelerated power reduction can be detected. One example of this detection function is illustrated in FIG. 5 by a steam generator feedwater pump monitor 26. Boron concentration analyzer 28, neutron flux detector 30, and control rod position detector 24 are common and state of the art instrumentation for nuclear reactors (see U.S. Pat. Nos. 3,578,562; 3,787,697; and 3,656,074 respectively).

The monitoring device 26 monitors the steam generator feedwater pump 16 to determine the status of the pump 16, since the failure of pump 16 is one event which gives rise to the demand for an accelerated power reduction. It should be recognized, however, that the accelerated power reduction actuation system can be responsive to events other than the failure to a steam generator feedwater pump 16. Accordingly, monitor 26 is selected and tailored to monitor the event of interest. In the example illustrated in FIG. 5, the steam generator feedwater pump 16 is a turbine driven pump which is tripped out of the system by rapidly draining the working fluid of the control system of the driving turbine. Accordingly, monitor 26 can consist of an electrical switch which is responsive to the solenoid which throws the valve that automatically drains the working fluid of the steam generator feedwater pump's driving turbine.

When an event occurs that requires an accelerated power reduction, such as the failure of one of the steam generator's feedwater pumps 16, the accelerated power reduction actuation system must respond to rapidly reduce the power of the nuclear reactor's core 18 to a value which is below a maximum permissible value as determined by the particular event but which remains above a certain predetermined lower limit. The upper limit is predetermined by that value of power above which the normal protection systems of the nuclear steam supply system would automatically terminate the operation of the nuclear steam supply system. The lower limit is determined by the power below which the nuclear steam supply system's operation becomes unstable. According to the invention, the accelerated power reduction is accomplished by causing rods or groups of rods to be rapidly inserted into the core on a selective basis without completely shutting down the reactor. It is also a feature of the present invention that the manner in which the rods are selectively tripped into the core follows the sequence which has been predetermined for the normal regulation of the nuclear reactor. Accordingly, when an event which requires an accelerated power reduction occurs (such as the failure of the steam generator feedwater pump 16) monitor 26 or some such equivalent monitor generates a signal indicating that the event has occured. In response to this signal, the accelerated power reduction actuation system drops a select number of control rods 20 into the reactor core 18. The signal from monitor 26 is delivered to an event monitor 54 which immediately generates a trip signal which is delivered to control rod drive mechanisms 22 for the purpose of tripping the first set of control rods 22. This trip signal also arms "and" gates 60 and 60' so that second and third sets of control rods 20 can also be dropped if the system so indicates. The portion of the event monitor 54 which generates the initial trip signal can consist of a simple power supply system and a permissive gate such as a flipflop which is actuated on the delivery of the pump status signal from monitor 26.

The remainder of the system illustrated in FIG. 5 is for the purpose of determining whether the insertion of the first bank of rods into the nuclear reactor core 18 is sufficient to reduce the reactor power to a value below the maximum permissible final power ($B_M$) after the event and to trip additional banks if required. The event monitor 54 or an equivalent power source delivers a signal indicative of the maximum permissible final power ($B_M$) after the event which has been predetermined for the occurrence of that event, to a comparator composed of summer 56 and comparator 58. The summer 56 subtracts the actual final power ($B_{f1}$) which could be expected after the insertion of the first bank from the signal ($B_M$). The apparatus upstream of summer 56 performs the function of calculating the actual final power ($B_{f1}$) that would be expected after the insertion of the first bank. As described above, the effect of the insertion of a bank of rods can be calculated by knowing the boron concentration of the primary coolant ($C_B$), the core power ($B_i$) and the position of the first bank of rods. The boronometer 28 monitors the boron concentration of the primary coolant and generates a signal ($C_B$) indicative of the boron concentration of the coolant. This signal is then multiplied by a constant $\eta$ and the product is added to a constant $\mu$ in element 32 to obtain the moderator temperature coefficient $\gamma_W$. Element 32 is a commercially available adder-subtracter such as a Bell and Howell type 19-301 adder-subtracter module. The moderator coefficient $\gamma_W$ is then divided in element 34 into the inverse of the slope of the curve of FIG. 1 ($S^{-1}$) as provided by element 36. The division accomplished by element 34 can be performed by using a Bell and Howell type 19-302 multiplier-divider module or any commercially available equivalent device. Element 36 can consist of a simple potentiometer which delivers a signal proportional to the inverse of the slope of FIG. 1 ($S^{-1}$). The resulting signal is then added in summer 38 to a constant ($\beta$) which is supplied by a potentiometer 40. The summing unit 38 can be a commercially available piece of equipment such as a Bell and Howell type 19-301 adder-subtracter module. The resulting quantity [$\beta + S^{-1}\gamma_W^{-1}$] is then multiplied in element 42 by the control rod worth of the first regulating rod group. The control rod worth is calculated by multiplying the position of the first regulating rod group by an appropriate constant ($K_{R1}$) in element 24 which can consist of a simple potentiometer.

The resulting signal from element 42 ($\Delta B_{A1}$) is indicative of the change in power which is caused by the insertion of the first bank of rods. This change in power ($\Delta B_{A1}$) is then subtracted from the initial reactor power ($B_i$) in subtracter unit 50. The initial power ($B_i$) is continuously supplied from neutron flux detector 30 and appropriate state of the art circuitry 52 which generates a signal indicative of initial reactor power from the neutron flux signal of detector 30. The result of the subtraction of the change in power expected from the insertion of the first bank ($\Delta B_{A1}$) from the initial reactor power ($B_i$) is the final reactor power which is expected from the insertion of the first bank of control rods ($B_{f1}$). As described above, this value is then compared to the maximum permissible final power after the event ($B_M$). When the comparison shows that ($B_{f1}$) is larger than the maximum permissible final power after the event ($B_M$) it is evident that the insertion of the first bank of control rods has not been sufficient to reduce the reactor power to below the maximum permissible final power after the event. In this case element 58 generates a digital trip signal which is delivered to the "and" gate 60 and a signal is passed by the "and" gate 60 to trip the second bank of control rods. If on the other hand ($B_{f1}$) is less that the maximum permissible final power after the event, then element 58 does not generate a trip signal and the "and" gate 60 is not actuated to pass the trip signal and the second bank of control rods is not tripped into the reactor core.

In a like manner, the system as illustrated in FIG. 5 also determines whether the third bank of rods has to be tripped into the core in order to reduce the final reactor power to a value below the maximum permissible final power after the event. As can be seen from FIG. 5, the circuitry necessary to accomplish this computation is identical to the circuitry necessary to determine whether the second bank should be tripped into the core, with the exception of the summing element 48. The summing element 48 sums the change expected from the insertion of the first bank as generated by element 42 and the change expected from the insertion of the second bank of rods as provided from element 42′. The result of the summation in element 48 is a value ($\Delta B_t$) which is indicative of the total change in reactor power to be expected from the insertion of the first and second banks of control rods. In a similar manner element 50′ subtracts this value from the initial power ($B_i$) to obtain a final power after the insertion of the first two banks ($B_{f2}$) which is then compared in element 56′ to the maximum permissible final power after the event ($B_M$). When ($B_{f2}$) is larger than ($B_M$) the unit 58′ delivers a signal to the "and" gate 60′ and "and" gate 60′ passes a trip signal to trip the third bank of control rods into the reactor core 18. Although it is unlikely on present reactors that a demand for an accelerated power reduction would ever require more than the first and second banks to be tripped into the reactor core, further banks can be tripped into the reactor core by means of circuitry similar to that disclosed in FIG. 5.

FIG. 6 illustrates an alternative embodiment of the present invention. Unlike the apparatus of FIG. 5 which compares the final reactor power to be expected after the insertion of the first or the first and second control rod banks with the maximum permissible final power after the event, the apparatus of FIG. 6 generates a minimum permissible change in reactor power ($\Delta B_p$) after the event and compares it to the actual reactor power reduction which is to be expected from the insertion of the appropriate set of rod banks. In order to do this, a summer 66 compares the maximum permissible final power after the event ($B_M$) as generated by potentiometer 68 with the initial power ($B_i$) as generated by element 52. The resulting signal ($\Delta B_p$) is the minimum permissible change in power after the event. $\Delta B_p$ is compared to $\Delta B_{A1}$ in element 64, which is a commercially available subtracter, and the resulting difference signal is delivered to signal generator 58 in a manner similar to the apparatus of FIG. 5. The same procedure is carried through for a decision whether to trip the third bank as well as the first and second banks. Although the apparatus of FIGS. 5 and 6 have been described in the manner which implies that the event monitor 62 trips the first bank of rods into the reactor core prior to the calculation of the effect of tripping the first bank into the core, it should be recognized that this calculation can be continuously performed on line so that when the event monitor supplies the arming signal to "and" gates 60 and 60′ the decision signals from signal generators 59 and 58′ are already established and the control rod banks to be tripped into the core are all tripped substantially at the same time. It should also be recognized that while the apparatus of FIGS. 5 and 6 have been described in terms of tripping individual banks into the core, the invention is broad enough to cover the procedure of tripping individual rods into the core if the regulation sequence involves the movement of individual rods. It should also be recognized that the regulation sequence may be a combination of the insertion of individual rods and regulating rod banks.

Having described an analogue implementation of the invention, an implementation by digital techniques will now be described. The basic scheme to implement the selection of the number of rod banks to be dropped in the event of an accelerated power reduction demand is as follows: the reactor power level range into which the reactor power must be dropped in order to accommodate the occurrence of the selected incidents is predetermined, such as 75 percent – 20 percent power; these predetermined maximum and minimum power level limits are then converted into a range of power defect reactivities to facilitate the selection of rod banks: where power defect reactivity is the reactivity worth required to bring about a change in power from a given initial power to a desired final power (thus, a maximum power defect would correspond to the minimum desired power level and a minimum power defect would correspond to the maximum desired power level); next, control rod bank worths are calculated for each set of control rod banks which are available for insertion into the core from the normal control sequence; the various control rod worths are then compared to the calculated maximum and minimum power defects to determine which group or groups of control rods should be dropped into the core; and this informational signal is sent to arm an "and gate" which is permissive only when the event monitor indicates that an appropriate event which calls for an accelerated power reduction has occurred.

In this digitally implemented embodiment the invention may be practiced on a dedicated microprocessor based microcomputer system. Such a system is the Process Computer Systems' Inc. Micropac 80 system which is a development system which utilizes the Intel 8080 microprocessor to accomplish the functions of the Arithmetic Logic Unit (ALU) and the Central Processing Unit (CPU). For a complete understanding of the Intel 8080 microprocessor and the Process Computer System, Micro Pac 80 microcomputer, the manufacturer's manuals *Intel* 8080 *Microcomputer System Manual,* January, 1975 and *PCS (Process Computer Systems) Micro Pac* 80/A *Users, Programmers, Operators Manual,* July, 1975 may be consulted respectively.

Figure 7:
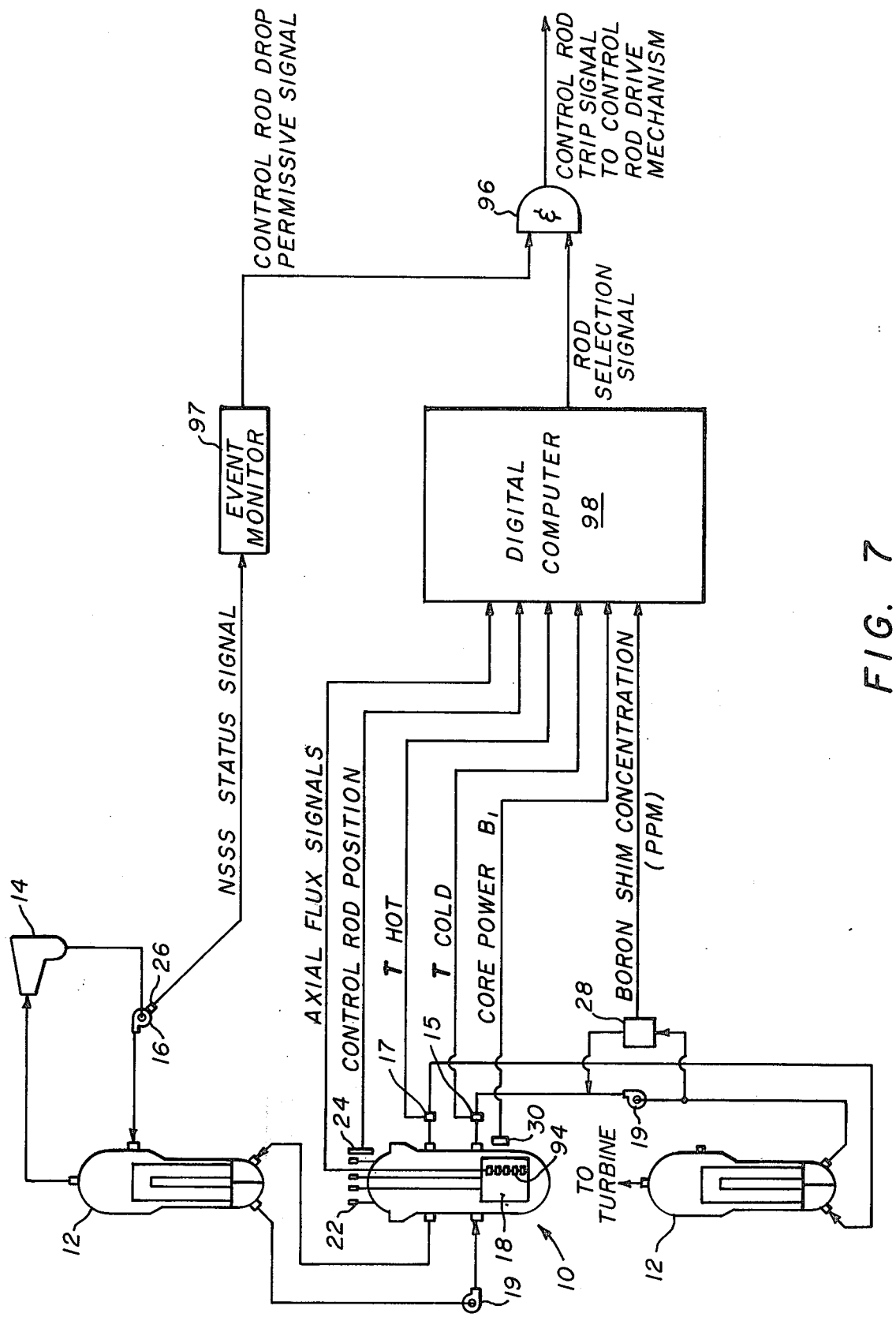
FIG. 7 is a diagrammatic representation of the hardware of one mode of practising the invention including a digital computer.

FIG. 7 illustrates the reactor power cutback system in combination with the digital computer 98 which makes the necessary computations and decisions. Signals which are additional to those described in the previous embodiments are necessary. These additional signals are: the temperature of the hot coolant ($T_{HOT}$) as it leaves the reactor 10, as measured by Resistance Temperature Detector 17; the temperature of the cold coolant ($T_{COLD}$) as it enters the reactor 10 as measured by Resistance Temperature Detector 15; and signals indicative of the axial power distribution designated as the "axial flux signals" as measured by a string of five in-core detectors 94. In addition to these new signals the digital computer 98 also makes use of the previously described Boron Shim Concentration Signal $C_B$ (or PPM), the core power $P_I$, and signals indicative of the control rod positions as determined by control rod position monitor 24.

Figure 10:
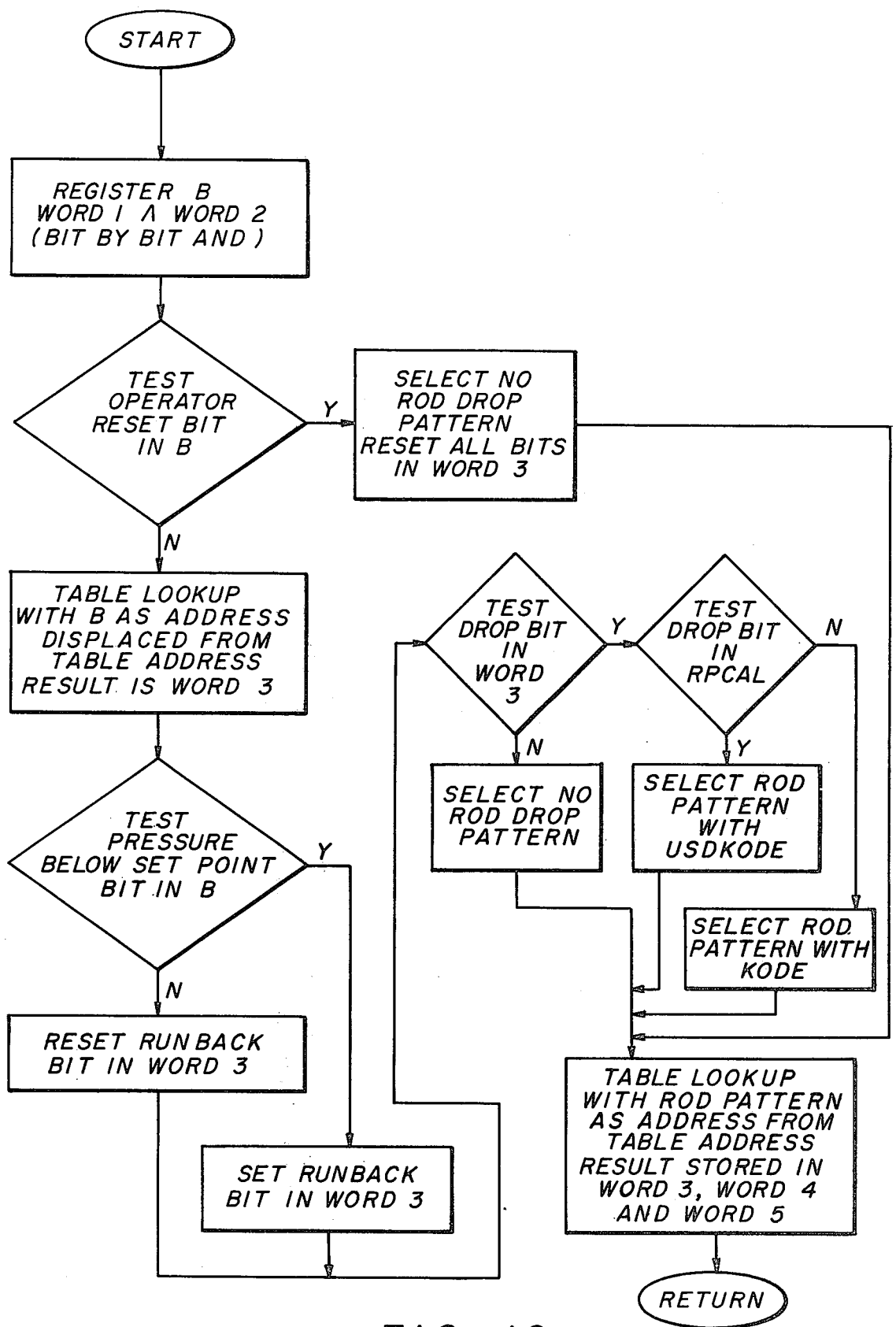
FIG. 10 is a flow chart illustrating one example of software which may be utilized in the "event monitor" to determine when an accelerated power reduction is required.

The Digital Computer 98 continually monitors the status of the reactor and continually determines which control rods 20 or control rod combinations should be inserted into the core 18 to achieve a successful accelerated power reduction in accordance with the algorithm described below. The event monitor 97 also continually monitors the nuclear plant status to determine when an event has occurred in response to which an accelerated power reduction is appropriate. The Event monitor 97 may be a simple device such as the previously described power supply and permissive gate or it may consist of a set of instructions to be implemented on a digital computer such as computer 98. Such a set of instructions is included, by way of example, in the program listing of Appendix 3 with the accompanying flow chart of FIG. 10. However, detailed explanation of the program listing for the Event monitor 97 will not be made here inasmuch as the details are not essential for the understanding and practice of the claimed invention. A person of ordinary skill in the art of programming will readily appreciate the details of the program listing of Appendix 3 after consulting the *Intel 8080 Microcomputer System Manual* of Jan. 1975 which sets forth the language definitions used in the program listing.

ALGORITHM DESCRIPTION

Figure 8A:
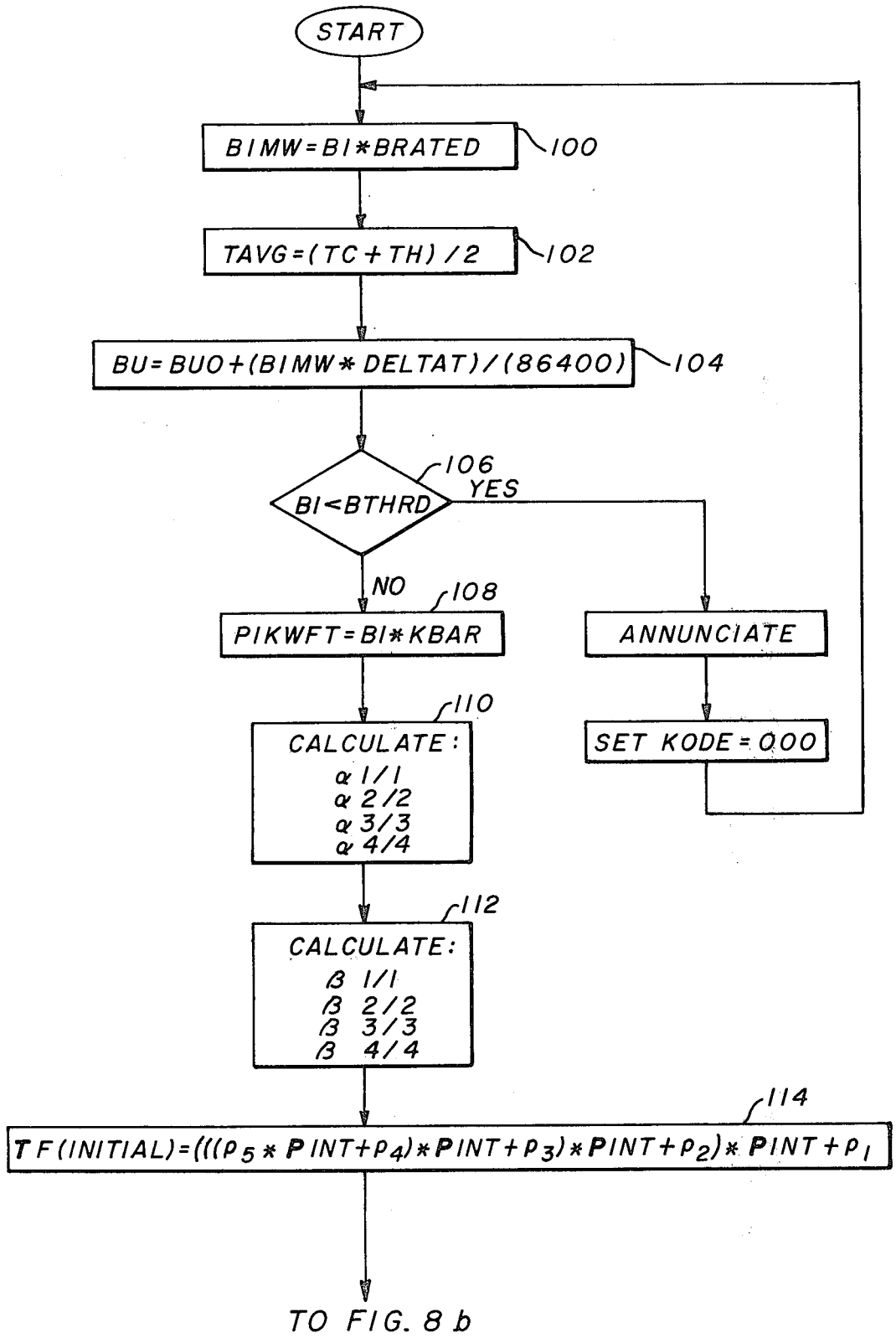
Figure 8C:
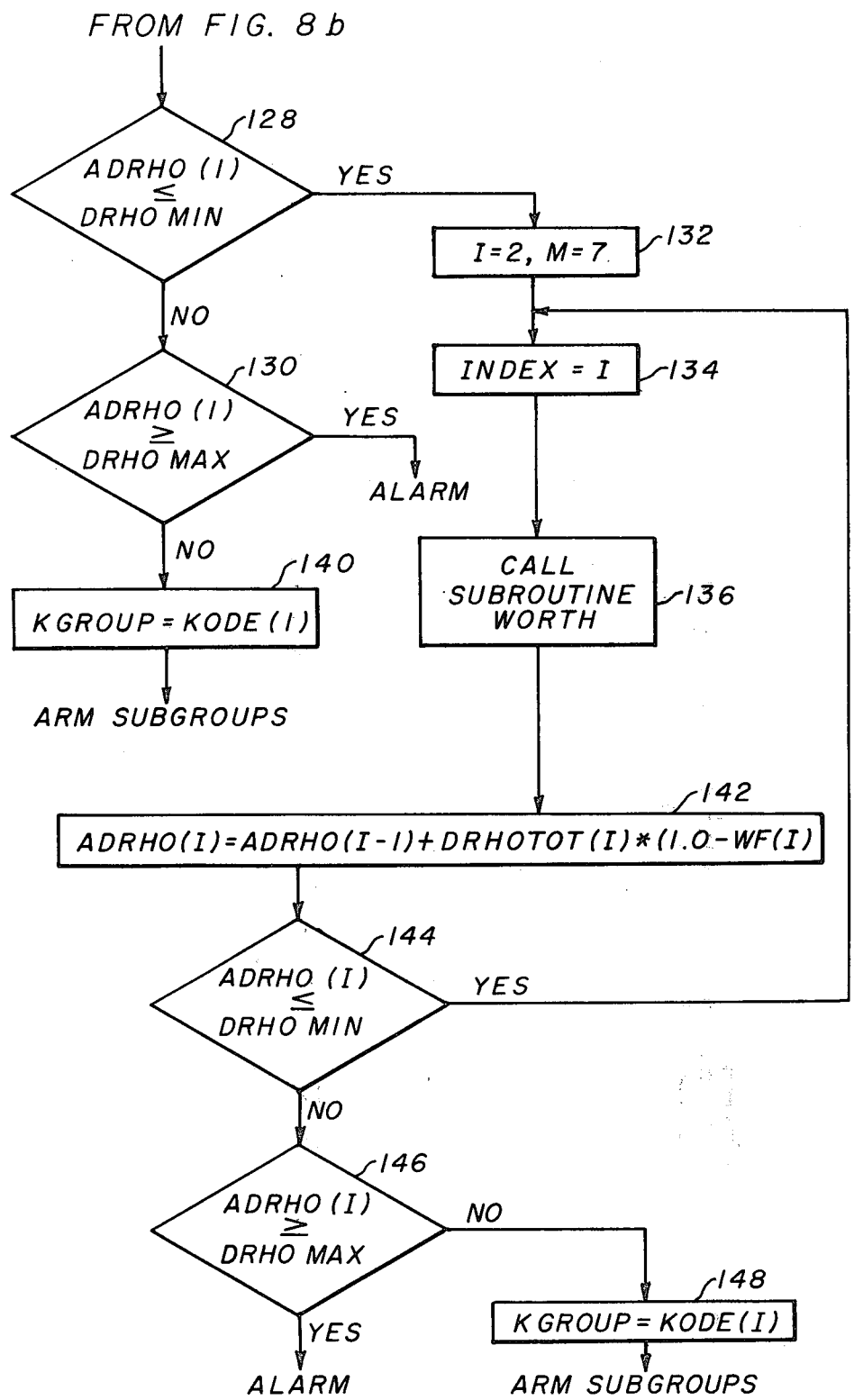

A flowchart of the CEA selection algorithm is presented in FIG. 8a-8c. A Fortran program of the CEA selection algorithm is presented in Appendix 1. It should be recognized by those skilled in the art of programming that most developed system software contains relatively minor faults known as bugs which sometimes take long periods of time to detect and/or diagnose. Ordinarily the correction of such faults is within the skill of control and system programmers. The program listing of the appendices accordingly may be expected to contain some faults of this kind but correction of all such faults should be within the skill of a person skilled in the art and should not detract from the enabling teaching which the listing is intended to convey.

The following is a discussion of the algorithm as presented in FIG. 8. The control rod selection program selects the required control rod subgroups to drop. The selection is based on a power defect calculation, a control rod subgroup available worth calculation and then an iteration among the available subgroup worths and the required worth to select the subgroups that satisfy the reactivity requirements.

Referring to the flow diagram of FIG. 8, the control rod selection calculation begins at box 100 by obtaining the present reactor power (BI) in percent of rated power (BIMW), the average temperature ($T_{AVG}$) is obtained at box 102 and the core average burnup (BU) in megawatt days is calculated at box 104 from the initial burnup (BUO) and updates utilizing power (BI) and real time (DELTAT in seconds) according to the following equation:

$$BU = BUO + \frac{(BIMW*DELTAT)}{86400}$$

Next, the percent power BI is compared at 106 to a threshold value of power (BTHRD). This threshold value of power is that value above which the occurrence of an event would require an accelerated power reduction (e.g. 20 percent of full power). If BI is less than or equal to BTHRD then the selection algorithm is not executed, an annunciator is activated to indicate that the power is less than the threshold and the rod selection output is set to all zeros. If the present power BI is greater than the threshold, then the selection program is executed.

The first step in the execution of the selection program is to convert the present power BI into kilowatts per foot (PIKWFT) so that the present power may be used further in the power defect calculation. The appropriate equation for this conversion if PIKWFT = BI*KBAR where PIKWFT = reactor power expressed in core average kilowatts per foot.

KBAR = conversion factor to KW/FT units and
BI = reactor power in percent of rated power.

The next task is to determine the power defects which correspond to the limits of the permissible power range that must be achieved after the accelerated power reduction. As is well known, the power defect is equal to the sum of the Doppler Reactivity Defect plus the Moderator Reactivity Defect. The Doppler Reactivity Defect is given by the relation $$\rho_D = \int_{P_I}^{P_F} \frac{d\rho}{dT_f} \frac{dT_f}{dP} dP$$

where
P = reactor power
$P_I$ = initial reactor power
$P_f$ = final reactor power
$T_f$ = final fuel temperature and
$d\rho/dT_f$ = the Doppler Coefficient The Doppler Coefficient may be determined from a third order polynomial fit to fuel temperature $$\text{Thus } \frac{d\rho}{dT_f} = a_1 + a_2 T_f + a_3 T_f^2 + a_4 T_f^3$$

where the $a$'s are functions of burnup and which can be determined by measuring power and by utilizing a linear interpolation of stored beginning of life (BOL) and end of life (EOL) values. A typical equation for $a_1$ is as follows:

$$a_1 = a_{2,1} - \frac{a_{1,1}}{BUEOL - BUBOL} *BU - BUBOL + a_{1,1}$$

This equation may be rewritten to be expressed as:

$$a_{i/j} = f_{ji} * BU + f_{j2}$$

where the $f$'s are constants obtained from a third order polynomial fit to the family of curves of Doppler Coefficient versus burnup for various times in core life.

The $a$'s are determined in box 110 of the flow diagram.

In a similar manner the Moderator Reactivity Defect is given by the relation $$\rho_M = \int_{P_I}^{P_F} \frac{d\rho}{dT_{AVG}} \frac{dT_{AVG}}{dP} dP$$

where $T_{AVG}$ is the moderator temperature and $d\rho/dT_{AVG}$ is the moderator coefficient.

The moderator coefficient is determined from a third order polynominal fit to moderator temperature.

$$\text{Thus } \frac{d\rho}{dT_{AVG}} = \beta_1 + \beta_2 T_{AVG} + \beta_3 T_{AVG}^2 + \beta_4 T_{AVG}^3$$

where the $\beta$'s are functions of the boron concentration PPM. For a given value of boron concentration (PPM), the $\beta$ coefficients are obtained utilizing polynomial fits of the coefficients as a function of the boron concentration. A typical equation is the equation for $\beta_1$ as follows:

$$\beta_1 = C_{1/1} + C_{1/2} * PPM + C_{1/3} * PPM_2^2 + C_{1/4} PPM^3$$

where $C_{ij}$ are stored constants obtained from a third order polynomial fit to the curve of moderator coefficient versus $T_{AVG}$ for various values of PPM. The equations for the other $\beta$'s are similar. The $\beta$'s are determined in box 112 of the flow diagram.

After having determined the $\alpha$ coefficients it is possible to calculate the minimum and the maximum Doppler Reactivity Defects from the following equations if the initial fuel temperature ($T_{F(Initial)}$) is known:

$$\rho_D(\text{initial}) = (((\alpha_{4/4} * T_{F(initial)} + \alpha_{3/3}) * T_{F(initial)} + \alpha_{2/2}) * T_{F(initial)} + \alpha_{1/1}) * T_{F(initial)};$$
$$\rho_D(\text{Final Max}) = (((\alpha_{4/4} * T_F(\text{Final Max}) + \alpha_{3/3}) * T_F(\text{Final Max}) + \alpha_{2/2}) * T_F(\text{Final Max}) + \alpha_{1/1}) * T_F(\text{Final Max});$$
$$\rho_D(\text{Final Min}) = (((\alpha_{4/4} * T_F(\text{Final Min}) + \alpha_{3/3}) * T_F(\text{Final Min}) + \alpha_{2/2} * T_F(\text{Final Min}) \alpha_{1/1}) * T_F(\text{Final Min});$$
$$\Delta\rho_{D(Min)} = \rho_{D(Initial)} - \rho_D(\text{Final Max}); \text{ and}$$
$$\Delta\rho_{D(Max)} = \rho_{D(Initial)} - \rho_D(\text{Final Min})$$

This calculation is performed at box 116. The initial fuel temperature $T_{F(initial)}$ is obtained from the relation $Tf = A (1 - Be^{-aP})$ which applies throughout the fuel cycle where P is equal to power. Where necessitated by limitations of the microprocessor systems, such as that cited above, this expression may be approximated by the polynomial expansion:

$$T_F = e_1 + e_2 P + e_3 P^2 + e_4 P^3 + e_5 P^4$$

where
$e_1 = +A$
$e_2 = +aAB$
$e_3 = -a^2 AB$
$e_4 = +1/6 \, a^3 AB$
$e_5 = -1/24 \, a^4 AB$, are stored coefficients and A, B and a are constants obtained empirically to fit the above fuel temperature relation.

Thus the equation for $T_{F(Initial)}$ is:

$$T_{F(Initial)} = (((e_5 * P \text{ initial} + e_4) * P \text{ initial} + e_3) * P \text{ initial} + e_2) * P \text{ initial} + e_1$$

and is evaluated at block 114. $T_F$(Final Max) and $T_F$(Final Min) are stored constants which have been precomputed using the above formula for power levels of 0.75 and 0.20, respectively.

In a similar manner the minimum and maximum moderator reactivity defects can be obtained from the following relationships:

$$\rho_{M(initial)} = (((\beta_{4/4} * T_{AV(initial)} + \beta_{3/3}) * T_{AV(initial)} + \beta_{2/2}) * T_{AV(initial)} + \beta_{1/1}) * T_{AV(initial)};$$
$$\rho_M(\text{Final Max}) = (((\beta_{4/4} * T_{AVFMAX} + \beta_{3/3}) * T_{AVFMAX} + \beta_{2/2}) * T_{AVFMAX} + \beta_{1/1}) * T_{AVFMAX};$$
$$\rho_M(\text{Final Min}) = (((\beta_{4/4} * T_{AVFMIN} + \beta_{3/3}) * T_{AVFMIN} + \beta_{2/2}) * T_{AVFMIN} + \beta_{1/1}) * T_{AVFMIN};$$
$$\Delta\rho_{M(Min)} = \rho_{M(initial)} - \rho_M(\text{Final Max}); \text{ and}$$
$$\Delta\rho_{M(Max)} = \rho_{M(initial)} - \rho_{hd} M(\text{Final Min})$$

where the values of $T_{AVFMAX}$ and $T_{AVFMIN}$ are those values of $T_{AV}$ at 0.75 and 0.20 rated power. Accordingly $T_{AVFMAX} = T_{AV\phi} + \hat{S} * (0.75)$ and $T_{AVFMIN} = T_{AV\phi} + \hat{S} * (0.20)$ where $\hat{S}$ is the slope of the $T_{AVG}$ program curve of FIG. 1. $T_{AVFMAX}$ and $T_{AVFMIN}$ can be stored constants which have been previously determined. The calculation of the moderator reactivity defects occurs at box 118 of the flow diagram. Next the minimum and the maximum reactivity defects are determined at box 120 by combining the minimum and maximum values of the Doppler Reactivity Defect and the Moderator Reactivity Defect.

The next calculation performed is the determination of the available control rod subgroup worths. The available worth is the amount of reactivity addition that would result when the subgroup is dropped full-in from its initial position. The available control rod subgroup worth calculation is performed in block 124 of FIG. 8 a-c by subroutine WORTH. Box 122 determines for which subgroup or set of subgroups the calculations is to be made. Subroutine WORTH of block 124 is more specifically set forth in the flow chart of FIG. 9 a-b and in the program listing of Appendix 2.

Subroutine WORTH utilizes the inputs of control and rod subgroup position (K POS), axial power distribution (PHI(J)), and axial shape index (ASI). The axial shape index is an index well understood in the science of reactor control and is equivalent to the power determined for the upper half of the reactor core minus the power determined for the lower half of the reactor core divided by the sum of the upper and lower powers. The axial power distribution is a measure of the shape of the power distribution along the z axis of the reactor core and is determined from the neutron flux measurements obtained by the five in-core detectors 94. In well known techniques, the in-core neutron flux detector readings are synthesized into axial power shapes by using an expansion of a few axially dependent Fourier modes to match the axial detector readings. Such a synthesis technique may be found described in the literature including: R. L. Hellens, T. G. Ober, R. D. Ober, *Transactions of the American Nuclear Society*, 12, 820 (1969); T. G. Ober, P. H. Gavin, *Transactions of the American Nuclear Society*, 19, 218–219 (1974); and M. M. Levine, D. J. Diamond, *Nuclear Science Engineering*, 47, 415–420 (1972).

The basis for the control rod subgroup worth calculation is a "flux-squared weighing" of the total inserted worth utilizing an adjoint axial flux distribution. The "flux-squared weighting" is derived from reactor theory and perturbation techniques and may be found in *Introduction to Nuclear Reactor Theory* by John R. Lamarsh, Addison Wesley Publishing Company, Reading, Massachusetts, 1966.

The equation of interest is:

$$\rho(z) = \frac{\int_0^Z \phi(z) \phi^*(z) dz}{\int_0^H \phi(z) \phi^*(z) dz} \cdot \rho(H)$$

where
- $\phi^*(z)$ = adjoint axial flux distribution
- $\phi(z)$ = axial flux distribution
- $\rho(H)$ = total reactivity of the inserted subgroup from full out to full in
- $\rho(z)$ = total reactivity inserted by the subgroup at $z$ percent insertion This equation can be rewritten as:

$$\rho(z) = WF \cdot \rho(H)$$

$$\text{where } WF = \frac{\int_0^Z \phi(z) \phi^*(z) dz}{\int_0^H \phi(z) \phi^*(z) dz} = \frac{\int_0^{KPOS} PHI(J) \cdot PHIADJ(J) dz}{\int_0^H PHI(J) \cdot PHIADJ(J) dz}$$

and where
- PHIADJ(J) = adjoint axial power distribution
- PHI(J) = axial power distribution
- KPOS = subgroup or group position in percent insertion
- H = active core length (100%)

Thus the worth which is available for insertion is equal to the total worth minus the inserted worth;

or ADRHO = $\pi(H) - WF \rho(H) = (1 - WF)\rho(H)$.

The adjoint flux to be used depends on the axial shape index and is obtained by weighting the axial power distribution PHI(J) by empirically determined constants A and B.

Thus if ASI is less than a given value C then:
PHIADJ(J) = PHI(J) for all nodes J = 1→41. But if ASI is greater than the value C then:
PHIADJ(J) = A * PHI(J) for nodes 1→21 and
PHIADJ(J) = B * PHI(J) for nodes 22→41

Figure 9A:
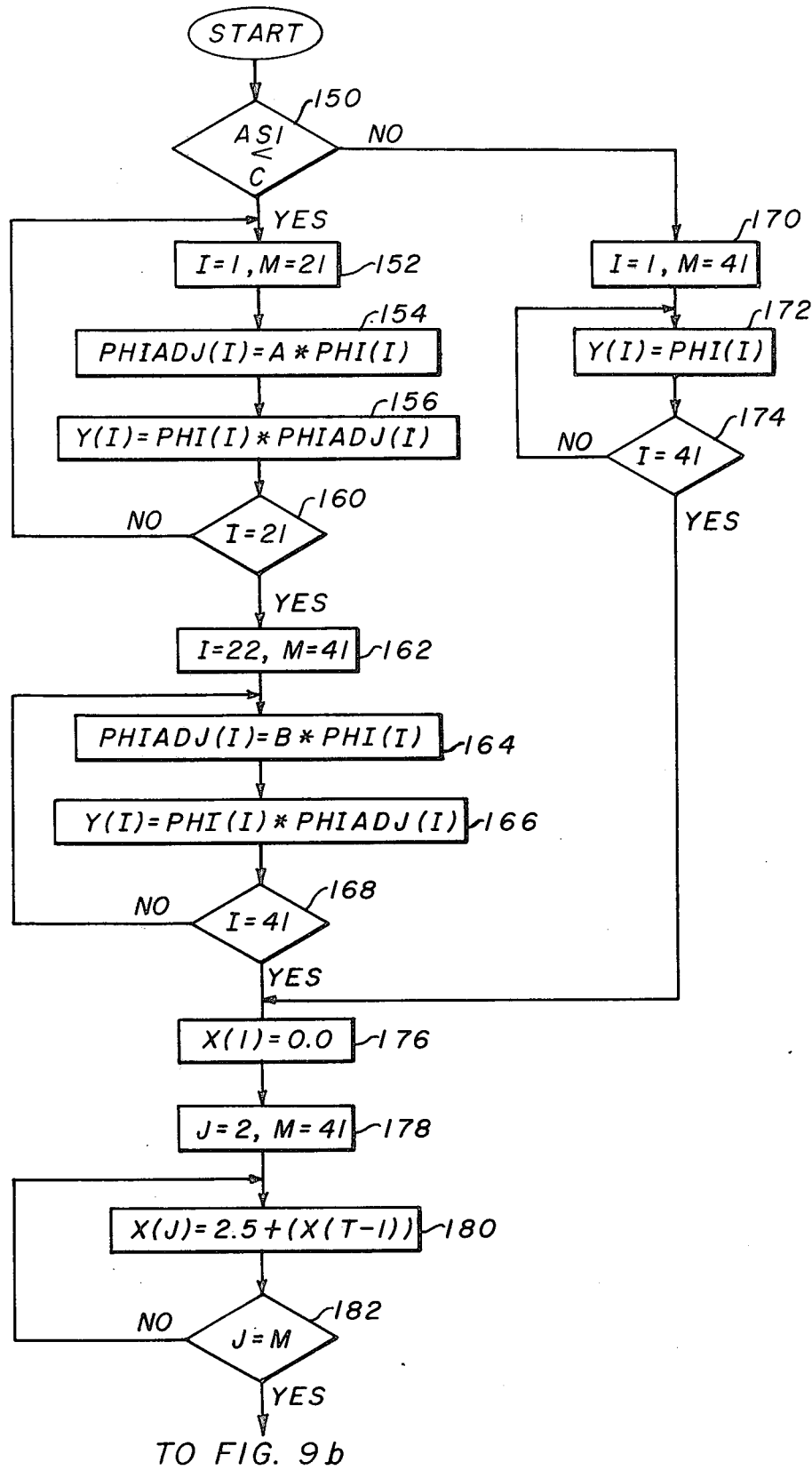

Boxes 150 through 174 of the flow chart of FIG. 9 make the comparison of ASI to C and establishes values for PHIADJ(J) as well as values for PHI(I) * PHI-LADJ(I) for axial nodes 1 through 41. Boxes 176 through 182 inclusive converts the z axis into inches to facilitate the numerical integration of the equation $$\int_a^b f(x)dx \simeq [\tfrac{1}{2}Y_0 + Y_1 \ldots Y_n - 1 + \tfrac{1}{2}Y_n] \Delta x$$

where
$Y = f(x) = PHI(J) * PHIADJ(I)$.

This numerical integration is carried out by boxes 184 to 190 for the denominator of the weighting factor equation.

In a similar fashion boxes 192 through 206 make a numerical integration of the numerator of the weighting factor equation. An additional complexity exists for the evaluation of the numerator of the weighting factor, however, since the integration is made from the bottom of the core to the position of the control rod subgroup (KPOS), which may be a position intermediate two of the axial nodes for which data exists. Thus, decision boxes 200, 202, and 204 determine the position of the control rod subgroup. Box 206 carries out an interpolation to obtain a value at KPOS when KPOS is between axial nodes. Box 206 also carries out the numerical integration utilizing the information from the interpolation. Finally, box 208 calculates the value of the weighting factor by dividing RHOW into RHOZW(J). The subroutine WORTH is run until weighting factors for all control rod subgroups and combinations are determined.

Having thus obtained the WF for each subgroup or combination, the available subgroup worth (ADRHO) is determined from the equation

ADRHO(J) = (1.0 − WF) * DRHOTOT(J)

where ADRHO(J) = available worth of subgroup or combination J
and DRHOTOT(J) = total inserted worth of the subgroup or combination.

Knowing the minimum and maximum power defects and the available subgroups worth, the selection of the subgroup(s) to be dropped can be made. The subgroup selection is done in flow chart elements 128 through 148 where available subgroup worths are compared to the required minimum and maximum defects. The selection iterates this comparison between the combination allowed to be dropped and the defect required. When a permissable subgroup is found, the selected subgroup(s) is armed to be dropped if and when an accelerated power reduction becomes necessary. If no acceptable subgroup is possible, then an alarm is activated annunciating this fact.

The "and gate" or permissive gate 60, 60' only permits the selected control rods to be inserted into the core when the event monitor has determined that an event has occurred which requires an accelerated power reduction.

What is claimed is:

1. An improved control method for maintaining the operation of a nuclear reactor system in response to an event which requires an immediate but less than complete power reduction called an accelerated power reduction, said reactor being of the type which has a reactor core cooled by a coolant circulated therethrough and control rods for movement into said core and said reactor further being of the type which is normally controlled by the insertion and withdrawal of a series of regulating rods into and out of said reactor core following a predetermined regulation sequence, wherein said improved method including the step of rapidly decreasing reactor power without causing the product of the radial peaking factor of said reactor core and the power of said reactor core to increase on the occurrence of an event which require an accelerated power reduction by rapidly inserting into said reactor core a portion of said regulating rods selected from said predetermined regulation sequence.

2. The improved method as recited in claim 1 wherein said step of rapidly decreasing reactor power includes selecting a number of regulating rods for insertion which is sufficient to reduce reactor power to a value greater than a predetermined lower limit but less than a predetermined upper limit.

3. The method of claim 2 wherein said predetermined upper limit is a value above which a reactor trip would automatically occur as the result of the occurrence of the particular event that requires an immediate but less than complete power reduction.

4. The method of claim 1 wherein said regulating rods are segregated into groups or banks and said predetermined regulation sequence is a sequence of insertion of regulating rod groups or banks.

5. The method of claim 2 wherein said step of selecting said regulating rods is completed before said selected regulating rods are inserted into said reactor core so that said selected regulating rods are all rapidly inserted into said reactor core at substantially the same time.

6. The method of claim 4 wherein said step of rapidly inserting a portion of said regulating rods includes the step of immediately inserting, on the detection of an event requiring an accelerated power reduction, that group or bank of regulating rods which, according to said predetermined regulation sequence, is the first group inserted into said core for normal reactor power regulation.

7. The method as recited in claim 1 wherein said step of rapidly inserting a portion of said regulating rods selected from said predetermined regulation sequence includes the following steps:
   a. rapidly inserting a first set of regulating rods from said predetermined regulation sequence;
   b. determining the need for a further power reduction; and
   c. successively rapidly inserting subsequent sets of regulating rods from said predetermined regulation sequence and determining the need for further power reduction until the power has been reduced to a value greater than a predetermined lower limit and less than an allowable upper limit.

8. The method of operating a nuclear power reactor as recited in claim 1 wherein the step of rapidly inserting a portion of said regulating rods selected from said predetermined regulation sequence includes the steps of:
   a. calculating the effect of the insertion into said reactor core of successfully greater numbers of regulating rods from said regulation sequence in their sequential order to obtain successive power predictions;
   b. comparing said power predictions to an allowable upper limit of reactor power; and
   c. selecting for insertion the combination of rods whose calculated power prediction first falls below said allowable upper limit of reactor power.

9. The improved control method for maintaining the operation of a nuclear reactor system as recited in claim 4 wherein said step of rapidly inserting a portion of said regulating rods selected from said predetermined regulation sequence includes the steps of:
   a. monitoring said reactor system to detect the occurrence of an event which requires an accelerated power reduction;
   b. generating a signal indicative of reactor power prior to the occurrence of said event;
   c. generating a signal indicative of the maximum permissible final power after the occurrence of said event;
   d. generating a signal indicative of the change in reactor power to be expected from the insertion into said core of a group of regulating rods selected from the beginning of said insertion sequence;
   e. determining from said signals indicative of reactor power, maximum permissable final power and change in reactor power the necessity of insertion of the group of regulating rods next in order in said predetermined regulation sequence; and
   f. inserting into said reactor core the regulating rods determined to be necessary to respond to the demand accelerated power reduction.

10. The improved control method for maintaining the operation of nuclear reactor system as recited in claim 9 wherein said step of determining the necessity of insertion of the group of control rods next in order in said predetermined regulation sequence includes the steps of:
    a. subtracting said signal indicative of maximum permissable final power from said signal indicative of reactor power to obtain a signal indicative of the minimum permissible reactor power reduction after the occurrence of said event;
    b. comparing said signal indicative of change in reactor power to said signal indicative of the minimum permissable reactor power reduction after the occurrence of said event; and
    c. from said comparison determining whether the next group of rods in said sequence need be inserted into said reactor core.

11. The improved control method for maintaining the operation of a nuclear reactor system as recited in claim 9 wherein said step of generating a signal indicative of the change in reactor power to be expected from the insertion into said core of a group of control rods at the beginning of said insertion sequence includes the steps of:
    a. measuring boric acid concentration of the coolant of said reactor;
    b. from said boric acid concentration generating a signal indicative of the moderator temperature coefficient of reactivity;
    c. measuring the position of the group of control rods at the beginning of said insertion sequence; and
    d. from said signal indicative of the moderator temperature coefficient of reactivity and from said position of said group of reactivity and from said position of said group of control rods, determining the change in reactor power to be expected from the insertion into said core of a group of control rods at the beginning of said insertion sequence and generating a signal indicative thereof.

* * * * *

UNITED STATES PATENT AND TRADEMARK OFFICE
CERTIFICATE OF CORRECTION

PATENT NO. : 4,075,059

DATED : February 21, 1978

INVENTOR(S) : Stephen J. Bruno et al.

It is certified that error appears in the above—identified patent and that said Letters Patent is hereby corrected as shown below:

Column 3, line 49, after "rod" insert -- drop --.

Column 5, line 17, "the", first occurrence, to -- then --.

Column 8, line 11, delete "7.".

Column 8, line 12, insert -- 7. -- before K

Column 9, line 3, "minitors" to read -- monitors --.

Column 14, line 13, "if" to read -- is --.

Column 15, line 54, "=" to read -- - --.

Column 16, line 2, delete "s,240  1".

Column 16, line 9, delete "phd M(FInal Min)"  insert -- $\rho$ M(Final Min) -.

UNITED STATES PATENT AND TRADEMARK OFFICE
CERTIFICATE OF CORRECTION

PATENT NO. : 4,075,059

DATED : February 21, 1978

INVENTOR(S) : Stephen J. Bruno et al.

It is certified that error appears in the above—identified patent and that said Letters Patent is hereby corrected as shown below:

Column 17, line 37, "π" to read -- P --.

Column 17, line 49, delete "L".

Signed and Sealed this

Eleventh Day of November 1980

[SEAL]

Attest:

SIDNEY A. DIAMOND

Attesting Officer

Commissioner of Patents and Trademarks